United States Patent

Izumisawa et al.

(10) Patent No.: US 11,537,828 B2
(45) Date of Patent: Dec. 27, 2022

(54) INFORMATION PROCESSING APPARATUS AND NON-TRANSITORY COMPUTER READABLE MEDIUM

(71) Applicant: FUJIFILM Business Innovation Corp., Tokyo (JP)

(72) Inventors: Yusuke Izumisawa, Kanagawa (JP); Toshihiro Iwafuchi, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 0 days.

(21) Appl. No.: 17/463,018

(22) Filed: Aug. 31, 2021

(65) Prior Publication Data

US 2022/0374663 A1 Nov. 24, 2022

(30) Foreign Application Priority Data

May 20, 2021 (JP) .............................. JP2021-085217

(51) Int. Cl.
*G06K 15/02* (2006.01)
(52) U.S. Cl.
CPC . *G06K 15/1878* (2013.01); *G06K 2215/0094* (2013.01)
(58) Field of Classification Search
CPC ................... G06K 15/1878; G06K 2215/0094
USPC ........................................ 358/3.27, 1.9, 1.15
See application file for complete search history.

(56) References Cited

U.S. PATENT DOCUMENTS

| | | | | |
|---|---|---|---|---|
| 2009/0225340 A1* | 9/2009 | Hatori | .................... | H04N 1/603 358/1.9 |
| 2013/0335761 A1* | 12/2013 | Koh | ...................... | H04N 1/6055 358/1.9 |
| 2020/0244839 A1 | 7/2020 | Hiramoto | | |

FOREIGN PATENT DOCUMENTS

JP 2020-120318 A 8/2020

* cited by examiner

*Primary Examiner* — Quang N Vo
(74) *Attorney, Agent, or Firm* — Oliff PLC

(57) ABSTRACT

An information processing apparatus includes a processor configured to: for each of values in a target device-independent color system, calculate values of some colors in a device-dependent color system including a spot color; change the values of some colors in the device-dependent color system so as to smooth changes in the values of some colors in the device-dependent color system in response to changes in the values in the device-independent color system; and for each of the values in the target device-independent color system, based on the values of some colors in the device-dependent color system after the change, calculate values of remaining colors in the device-dependent color system, and generate a color-conversion profile with the values in the device-independent color system as input and the values of some colors in the device-dependent color system after the change and the values of the remaining colors in the device-dependent color system as output.

9 Claims, 4 Drawing Sheets

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2021-085217 filed May 20, 2021.

BACKGROUND

(i) Technical Field

The present disclosure relates to an information processing apparatus and a non-transitory computer readable medium.

(ii) Related Art

Japanese Unexamined Patent Application Publication No. 2020-120318 describes a color separation table generating method. The method includes: an initial step of setting a grid point with a process color as a color component, and generating a color separation table expressed by a separation value of each color component when a color on each grid point is approximated by a mixture of the process color and a spot color; a smoothing step of smoothing a separation value corresponding to each grid point of the color separation table; and a color mismatch correction step of changing the smoothed separation value corresponding to each grid point of the color separation table so as to correct color mismatch due to the smoothing. In the color mismatch correction step, while a separation value of some color components of the process colors and spot color remains fixed, a separation value of another or other color components is changed.

Technology for generating a color conversion profile by performing smoothing is available. In this technology, smoothing is performed on all colors, and a color conversion profile is generated.

However, since smoothing is performed on all colors, although gradation is improved, color reproducibility is lowered. In particular, if the colors of the color conversion profile include a spot color, because the accuracy of the spot-color color conversion profile is low, it is difficult to achieve both gradation and color reproducibility.

SUMMARY

Aspects of non-limiting embodiments of the present disclosure relate to providing an information processing apparatus and a non-transitory computer readable medium storing a program for achieving both gradation and color reproducibility, compared to the case where smoothing is performed on all colors of a color conversion profile.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to: for each of values in a target device-independent color system, calculate values of some colors in a device-dependent color system including a spot color; change the values of the some colors in the device-dependent color system so as to smooth changes in the values of the some colors in the device-dependent color system in response to changes in the values in the device-independent color system; and for each of the values in the target device-independent color system, based on the values of the some colors in the device-dependent color system after the change, calculate values of remaining colors in the device-dependent color system, and generate a color-conversion profile with the values in the device-independent color system as input and the values of the some colors in the device-dependent color system after the change and the values of the remaining colors in the device-dependent color system as output.

BRIEF DESCRIPTION OF THE DRAWINGS

Exemplary embodiments of the present disclosure will be described in detail based on the following figures, wherein.

DETAILED DESCRIPTION

Figure 1:
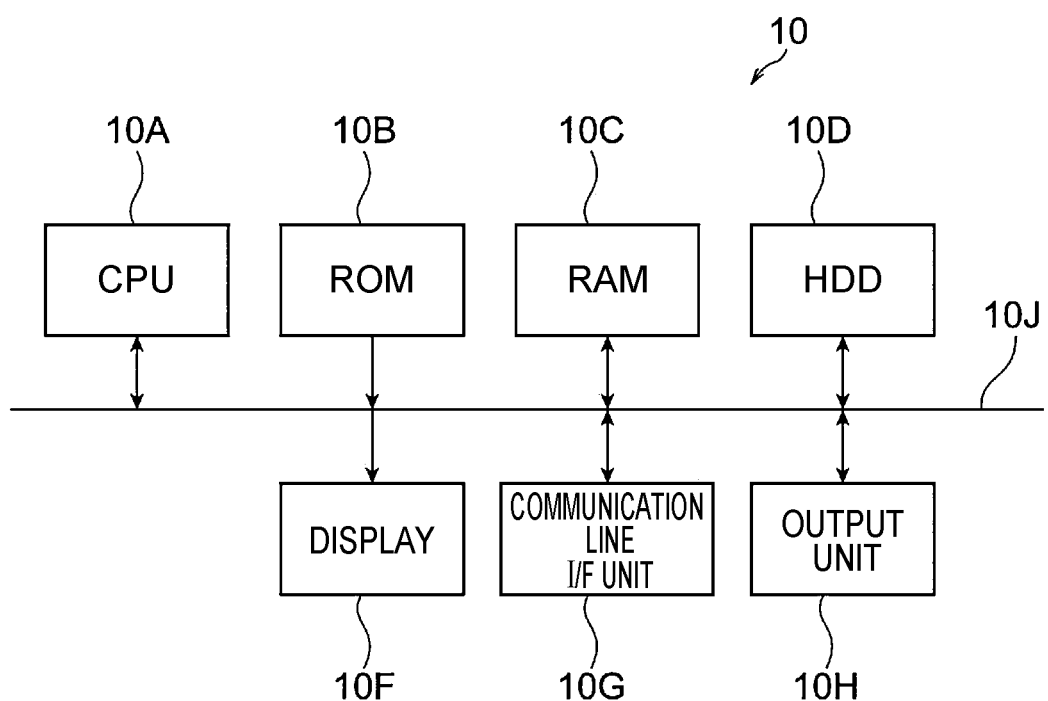
FIG. 1 is a block diagram illustrating the hardware configuration of an image forming apparatus according to a first exemplary embodiment.

Hereinafter, exemplary embodiments of the present disclosure will be described with reference to the drawings. Note that the same or equivalent elements and parts in the drawings are given the same reference numeral. In addition, the dimensional ratios in the drawings are exaggerated for convenience of description, and may differ from the actual ratios.

First Exemplary Embodiment

FIG. 1 is a block diagram illustrating the hardware configuration of an image forming apparatus serving as an information processing apparatus according to a first exemplary embodiment.

An image forming apparatus 10 is an apparatus that forms an image on a recording medium such as paper on the basis of a print job. The image forming apparatus 10 may be any apparatus, such as a printer or a multifunctional peripheral.

The image forming apparatus 10 according to the present exemplary embodiment includes a central processing unit (CPU) 10A, which serves as an example of a processor, a read-only memory (ROM) 10B, a random-access memory (RAM) 10C, a hard disk drive (HDD) 10D, a display 10F, a communication interface (I/F) unit 10G, and an output unit 10H.

The CPU 10A controls the overall operation of the image forming apparatus 10. The ROM 10B stores in advance various control programs and various parameters. The RAM 10C is used as a work area for the CPU 10A when the CPU 10A executes various programs. The HDD 10D stores various types of data and application programs. A touchscreen display is applied as the display 10F, which is used for inputting various types of information and displaying various types of information.

The communication I/F unit 10G is connected to a communication line (not illustrated), and transmits/receives various types of data to/from another apparatus connected to the communication line.

The output unit 10H forms an image on a recording medium such as paper using ink or toner of each color of cyan, magenta, yellow, black (CMYK) and one or more spot colors (such as fluorescent pink) on the basis of a print job.

These units of the above image forming apparatus 10 are electrically connected to one another by a system bus 10J. Although the HDD 10D is applied as a memory in the image forming apparatus 10 according to the present exemplary embodiment, this is not the only possible application; for example, another non-volatile memory such as flash memory is also applicable.

With the above configuration, the image forming apparatus 10 according to the present exemplary embodiment executes the following by using the CPU 10A: accessing the ROM 10B, RAM 10C, and HDD 10D; obtaining various types of data via the display 10F; and displaying various types of information on the display 10F. In addition, the image forming apparatus 10 executes, by using the CPU 10A, control of transmission/reception of communication data via the communication I/F unit 10G. For example, the image forming apparatus 10 receives image data via the communication I/F unit 10G from an information processing terminal realized by a personal computer (PC) or the like.

In the image forming apparatus 10 according to the present exemplary embodiment, the CPU 10A executes a program stored in advance in the ROM 10B or the HDD 10D, thereby performing a process of generating a color conversion profile with values in a device-independent color system as input and values in a device-dependent color system as output.

Figure 2:
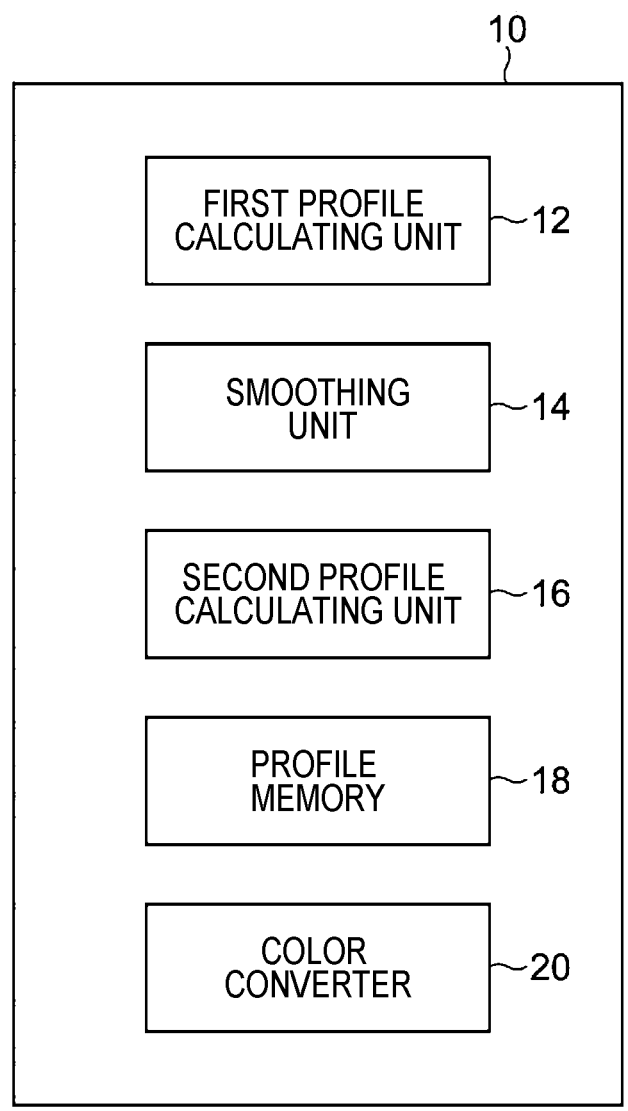
FIG. 2 is a functional block diagram of the image forming apparatus according to the first exemplary embodiment.

Next, the functional configuration of the image forming apparatus 10 according to the present exemplary embodiment configured as above will be described. FIG. 2 is a functional block diagram of the image forming apparatus 10 according to the present exemplary embodiment. Note that each functional unit is realized by executing, by the CPU 10A, a program stored in advance in the ROM 10B or the HDD 10D.

The image forming apparatus 10 has the functions of a first profile calculating unit 12, a smoothing unit 14, a second profile calculating unit 16, a profile memory 18, and a color converter 20.

The first profile calculating unit 12 regards each of values in a device-independent color system (such as the L*a*b space) corresponding to values (such as R, G, B=0, 0, 0 to 255, 255, 255) in a first device-dependent color system (such as red, green, and blue (RGB)) at each of grid points in an input color gamut of the information processing terminal as a value in the target device-independent color system. The first profile calculating unit 12 calculates, for each of the values in the target device-independent color system, the values of a spot color in a second device-dependent color system (such as CMYK and spot color) including the spot color.

The smoothing unit 14 changes the values of the spot color in the second device-dependent color system so as to smooth changes in the values of the spot color in response to changes in the values in the device-independent color system.

The second profile calculating unit 16 calculates, for each of the values in the target device-independent color system, the values of K in the second device-dependent color system on the basis of the values of the spot color after the change.

The second profile calculating unit 16 calculates, for each of the values in the target device-independent color system, the values of CMY in the second device-dependent color system on the basis of the values of the spot color after the change and the values of K.

The second profile calculating unit 16 generates, on the basis of the calculation results of the values of the spot color after the change, the values of K, and the values of CMY, spot-color-version, K-version, and CMY-version color conversion profiles with the values in the device-independent color system as input and the values of the spot color after the change, the values of K, and the values of CMY in the second device-dependent color system as output.

The profile memory 18 stores the generated spot-color-version, K-version, and CMY-version color conversion profiles.

Using the spot-color-version, K-version, and CMY-version color conversion profiles, the color converter 20 performs color conversion processing of image data received from the information processing terminal to generate a print job represented by CMYK spot color data, and outputs the print job to the output unit 10H.

Figure 3:
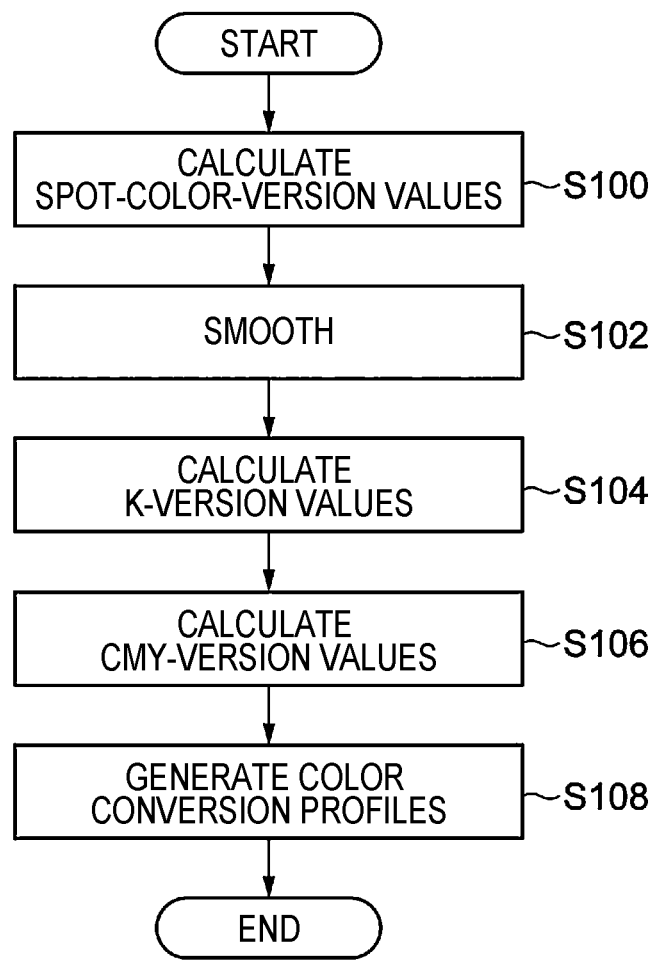
FIG. 3 is a flowchart illustrating an example of the flow of a specific process performed by the image forming apparatus according to the first exemplary embodiment.

Next, a process performed by the image forming apparatus 10 according to the first exemplary embodiment configured as above will be described. FIG. 3 is a flowchart illustrating an example of the flow of a specific process performed by the image forming apparatus 10 according to the present exemplary embodiment. Note that the process illustrated in FIG. 3 starts in response to the issuing of a color conversion profile generation command by the image forming apparatus 10.

In step S100, the first profile calculating unit 12 calculates, for each of the values in the target device-independent color system, the values of the spot color in the second device-dependent color system.

In step S102, the smoothing unit 14 changes the values of the spot color in the second device-dependent color system so as to smooth changes in the values of the spot color in response to changes in the values in the device-independent color system.

In step S104, the second profile calculating unit 16 calculates, for each of the values in the target device-independent color system, the values of K in the second device-dependent color system on the basis of the values of the spot color after the change.

In step S106, the second profile calculating unit 16 calculates, for each of the values in the target device-independent color system, the values of CMY in the second device-dependent color system on the basis of the values of the spot color after the change, and the values of K.

The second profile calculating unit 16 generates, on the basis of the calculation results of the values of the spot color after the change, the values of K, and the values of CMY, spot-color-version, K-version, and CMY-version color conversion profiles with the values in the device-independent color system as input and the values of the spot color after the change, the values of K, and the values of CMY in the second device-dependent color system as output.

The generated spot-color-version, K-version, and CMY-version color conversion profiles are stored in the profile memory 18, and the process ends.

As described above, when generating a color conversion profile that outputs values in a device-dependent color system including a spot color from values in a device-independent color system, smoothing is performed on the values of some colors in the device-dependent color system, and then the values of remaining colors are calculated, thereby generating a color conversion profile. In doing so, both gradation and color reproducibility may be achieved.

In addition, because the accuracy of generating a spot-color color conversion profile is low, the gradation of the color conversion profile may be improved by performing smoothing on the values of the spot color, and then the values of remaining colors are calculated, thereby generating a color conversion profile. In doing so, both gradation and color reproducibility may be achieved.

Although the exemplary case in which smoothing is performed only on the spot-color version has been described in the above-described exemplary embodiment, this is not the only possible case. Smoothing may also be performed on the K-version.

Although the exemplary case in which there is one spot color has been described, this is not the only possible case. There may be plural spot colors. For example, fluorescent pink and green may serve as spot colors. In this case, smoothing may be performed on all the plural spot colors. Specifically, the following processing may be performed on each of the plural spot colors. For each of values in a target device-independent color system, the values of the spot color are calculated; and the values of the spot color in a device-dependent color system are changed so as to smooth changes in the values of the spot color in the device-dependent color system in response to changes in the values in the device-independent color system. In addition, smoothing may be performed only on some of the plural spot colors. In addition, the types of spot colors are not limited to fluorescent pink and green.

Second Exemplary Embodiment

Next, an image forming apparatus according to a second exemplary embodiment will be described. Because the image forming apparatus according to the second exemplary embodiment has the same configuration as that of the first exemplary embodiment, a description thereof is omitted by using the same reference numerals.

In the second exemplary embodiment, the point that smoothing is performed on the K version is different from the first exemplary embodiment.

The first profile calculating unit 12 of the image forming apparatus 10 of the second exemplary embodiment regards each of values in the device-independent color system corresponding to values in the first device-dependent color system of each of the grid points in the input color gamut of the information processing terminal as a value in the target device-independent color system. The first profile calculating unit 12 calculates, for each of the values in the target device-independent color system, the values of K in the second device-dependent color system including a spot color.

The smoothing unit 14 changes the values of K in the second device-dependent color system so as to smooth changes in the values of K in response to changes in the values in the device-independent color system.

The second profile calculating unit 16 calculates, for each of the values in the target device-independent color system, the values of the spot color in the second device-dependent color system on the basis of the values of K after the change.

The second profile calculating unit 16 calculates, for each of the values in the target device-independent color system, the values of CMY in the second device-dependent color system on the basis of the values of K after the change and the values of the spot color.

The second profile calculating unit 16 generates, on the basis of the calculation results of the values of K after the change, the values of the spot color, and the values of CMY, spot-color-version, K-version, and CMY-version color conversion profiles with the values in the device-independent color system as input and the values of K after the change, the values of the spot color, and the values of CMY in the second device-dependent color system as output.

The profile memory 18 stores the generated spot-color-version, K-version, and CMY-version color conversion profiles.

Figure 4:
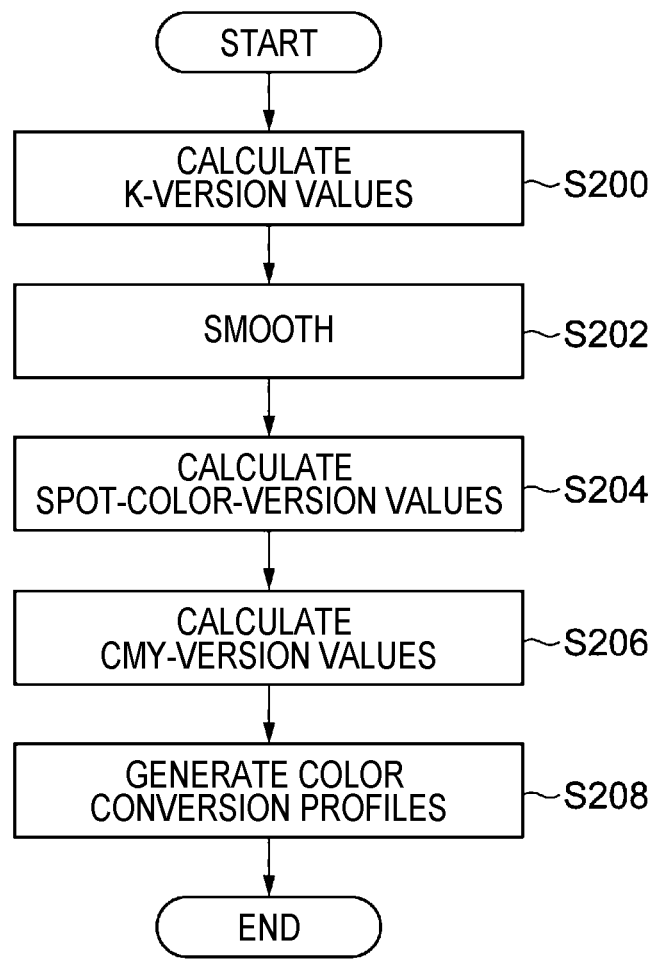
FIG. 4 is a flowchart illustrating an example of the flow of a specific process performed by an image forming apparatus according to a second exemplary embodiment.

Next, a process performed by the image forming apparatus 10 according to the second exemplary embodiment configured as above will be described. FIG. 4 is a flowchart illustrating an example of the flow of a specific process performed by the image forming apparatus 10 according to the second exemplary embodiment. Note that the process illustrated in FIG. 4 starts in response to the issuing of a color conversion profile generation command by the image forming apparatus 10.

In step S200, the first profile calculating unit 12 calculates, for each of the values in the target device-independent color system, the values of K in the second device-dependent color system.

In step S202, the smoothing unit 14 changes the values of K in the second device-dependent color system so as to smooth changes in the values of K in response to changes in the values in the device-independent color system.

In step S204, the second profile calculating unit 16 calculates, for each of the values in the target device-independent color system, the values of the spot color in the second device-dependent color system on the basis of the values of K after the change.

In step S206, the second profile calculating unit 16 calculates, for each of the values in the target device-independent color system, the values of CMY in the second device-dependent color system on the basis of the values of K after the change, and the values of the spot color in the spot-color-version color conversion profile.

The second profile calculating unit 16 generates, on the basis of the calculation results of the values of K after the change, the values of the spot color, and the values of CMY, spot-color-version, K-version, and CMY-version color conversion profiles with the values in the device-independent color system as input and the values of K after the change, the values of the spot color, and the values of CMY in the second device-dependent color system as output.

The generated spot-color-version, K-version, and CMY-version color conversion profiles are stored in the profile memory 18, and the process ends.

As described above, when generating a color conversion profile that outputs values in a device-dependent color system including a spot color from values in a device-independent color system, smoothing is performed on black in the device-dependent color system, and the values of remaining colors are calculated, thereby generating a color conversion profile. In doing so, both gradation and color reproducibility may be achieved.

Although the exemplary case in which smoothing is performed only on the K-color version has been described in the above-described second exemplary embodiment, this is not the only possible case. Smoothing may also be performed on the spot-color version.

Although the exemplary case in which there is one spot color has been described, this is not the only possible case. There may be plural spot colors. In this case, after smoothing is performed on the K-version, the following processing may be performed on each of the plural spot colors. For each of the values in the target device-independent color system, on the basis of the values of K after the change, the values of the spot color in the device-dependent color system are calculated. For each of the values in the target device-independent color system, on the basis of the values of K after the change and the values of each of the spot colors, the values of CMY in the device-dependent color system are calculated, thereby generating spot-color-version, K-version, and CMY-version color conversion profiles.

Although the exemplary case in which the device-independent color system is the L*a*b* space has been described in the above-described first and second exemplary embodiments, this is not the only possible case, and the device-independent color system may be other color spaces.

Although the exemplary case in which the second device-dependent color system includes spot colors and CMYK has been described, this is not the only possible case, and colors other than spot colors may be colors other than CMYK.

Although the exemplary case of applying the present disclosure to the image forming apparatus has been described, this is not the only possible case. The present disclosure is applicable to information processing apparatuses such as smartphones and computers.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

In addition, a process performed by the image forming apparatus 10 according to the above-described exemplary embodiments may be a process performed by software, a process performed by hardware, or a process combining the two. In addition, a process performed by the image forming apparatus 10 may be stored as a program in a storage medium for distribution.

The present disclosure is not limited to the above, and needless to say, may be implemented by adding, in addition to the above, various modifications within a range not deviating from the gist thereof.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to:
for each of values in a target device-independent color system, calculate a value of only some color in a device-dependent color system including a spot color, wherein the spot color includes fluorescent pink and is not a CMYK color;
change the value of the some color in the device-dependent color system so as to smooth changes in the value of the some color in the device-dependent color system in response to changes in the values in the device-independent color system, wherein values of remaining colors in the device-dependent color system are not calculated until after the value of the some color in the device-dependent color system is changed; and
for each of the values in the target device-independent color system, based on the value of the some color in the device-dependent color system after the change, calculate the values of the remaining colors in the device-dependent color system, and generate a color-conversion profile with the values in the device-independent color system as input and the value of the some color in the device-dependent color system after the change and the values of the remaining colors in the device-dependent color system as output.

2. The information processing apparatus according to claim 1, wherein
the processor is configured to:
for each of the values in the target device-independent color system, based on values of the spot color in the device-dependent color system after the change, calculate values of black color in the device-dependent color system; and
for each of the values in the target device-independent color system, based on the values of the spot color in the device-dependent color system after the change and the values of the black color, calculate the values of the remaining colors in the device-dependent color system, and generate the color-conversion profile with the values in the device-independent color system as input and the values of the spot color in the device-dependent color system after the change, the values of the black color, and the values of the remaining colors in the device-dependent color system as output.

3. The information processing apparatus according to claim 1, wherein:
the some color in the device-dependent color system includes a plurality of spot colors which include fluorescent pink and are not a CMYK color, and
the processor is configured to:
for each of the plurality of spot colors,
for each of the values in the target device-independent color system, calculate values of the respective spot color; and
change the values of the respective spot color in the device-dependent color system so as to smooth changes in the values of the respective spot color in the device-dependent color system in response to changes in the values in the device-independent color system.

4. The information processing apparatus according to claim 1, wherein:

the some color in the device-dependent color system includes the spot color and black color, and the processor is configured to:

for each of the values in the target device-independent color system, calculate values of the spot color;

change the values of the spot color in the device-dependent color system so as to smooth changes in the values of the spot color in the device-dependent color system in response to changes in the values in the device-independent color system;

for each of the values in the target device-independent color system, calculate values of the black color based on the values of the spot color after the change;

change the values of the black color in the device-dependent color system so as to smooth changes in the values of the black color in the device-dependent color system in response to changes in the values in the device-independent color system; and for each of the values in the target device-independent color system, based on the values of the spot color in the device-dependent color system after the change and the values of the black color after the change, calculate the values of the remaining colors in the device-dependent color system, and generate the color-conversion profile with the values in the device-independent color system as input and the values of the spot color in the device-dependent color system after the change, the values of the black color after the change, and the values of the remaining colors in the device-dependent color system as output.

5. The information processing apparatus according to claim 1, wherein:

the some color in the device-dependent color system includes black color, and the processor is configured to:

for each of the values in the target device-independent color system, based on values of the black color in the device-dependent color system after the change, calculate values of the spot color in the device-dependent color system; and for each of the values in the target device-independent color system, based on the values of the black color in the device-dependent color system after the change and the values of the spot color, calculate the values of the remaining colors in the device-dependent color system, and generate the color-conversion profile with the values in the device-independent color system as input and the values of the black color in the device-dependent color system after the change, the values of the spot color, and the values of the remaining colors in the device-dependent color system as output.

6. The information processing apparatus according to claim 5, wherein:

the spot color includes a plurality of spot colors which include fluorescent pink and are not a CMYK color, and the processor is configured to:

for each of the plurality of spot colors, for each of the values in the target device-independent color system, based on the values of the black color in the device-dependent color system after the change, calculate values of each spot color in the device-dependent color system; and for each of the values in the target device-independent color system, based on the values of the black color in the device-dependent color system after the change and the values of each of the plurality of spot colors, calculate the values of the remaining colors in the device-dependent color system, and generate the color-conversion profile with the values in the device-independent color system as input and the values of the black color in the device-dependent color system after the change, the values of each of the plurality of spot colors, and the values of the remaining colors in the device-dependent color system as output.

7. The information processing apparatus according to claim 1, wherein:

the some color in the device-dependent color system includes the spot color and black color, and the processor is configured to:

for each of the values in the target device-independent color system, calculate values of the black color;

change the values of the black color in the device-dependent color system so as to smooth changes in the values of the black color in the device-dependent color system in response to changes in the values in the device-independent color system;

for each of the values in the target device-independent color system, calculate values of the spot color based on the values of the black color after the change;

change the values of the spot color in the device-dependent color system so as to smooth changes in the values of the spot color in the device-dependent color system in response to changes in the values in the device-independent color system; and for each of the values in the target device-independent color system, based on the values of the black color in the device-dependent color system after the change and the values of the spot color after the change, calculate the values of the remaining colors in the device-dependent color system, and generate the color-conversion profile with the values in the device-independent color system as input and the values of the black color in the device-dependent color system after the change, the values of the spot color after the change, and the values of the remaining colors in the device-dependent color system as output.

8. A non-transitory computer readable medium storing a program causing a computer to execute a process, the process comprising:

for each of values in a target device-independent color system, calculating a value of only some color in a device-dependent color system including a spot color, wherein the spot color includes fluorescent pink and is not a CMYK color;

changing the value of the some color in the device-dependent color system so as to smooth changes in the value of the some color in the device-dependent color system in response to changes in the values in the device-independent color system, wherein values of remaining colors in the device-dependent color system are not calculated until after the value of the some color in the device-dependent color system is changed; and for each of the values in the target device-independent color system, based on the value of the some color in the device-dependent color system after the change, calculating the values of the remaining colors in the device-dependent color system, and generating a color-conversion profile with the values in the device-independent color system as input and the value of the some color in the device-dependent color system after the change and the values of the remaining colors in the device-dependent color system as output.

9. An information processing apparatus comprising:

means for calculating, for each of values in a target device-independent color system, a value of only some color in a device-dependent color system including a spot color, wherein the spot color includes fluorescent pink and is not a CMYK color;

means for changing the value of the some color in the device-dependent color system so as to smooth changes in the value of the some color in the device-dependent color system in response to changes in the values in the device-independent color system, wherein values of remaining colors in the device-dependent color system are not calculated until after the value of the some color in the device-dependent color system is changed; and means for calculating, for each of the values in the target device-independent color system, based on the value of the some color in the device-dependent color system after the change, the values of the remaining colors in the device-dependent color system, and generating a color-conversion profile with the values in the device-independent color system as input and the value of the some color in the device-dependent color system after the change and the values of the remaining colors in the device-dependent color system as output.

* * * * *